UNITED STATES PATENT OFFICE.

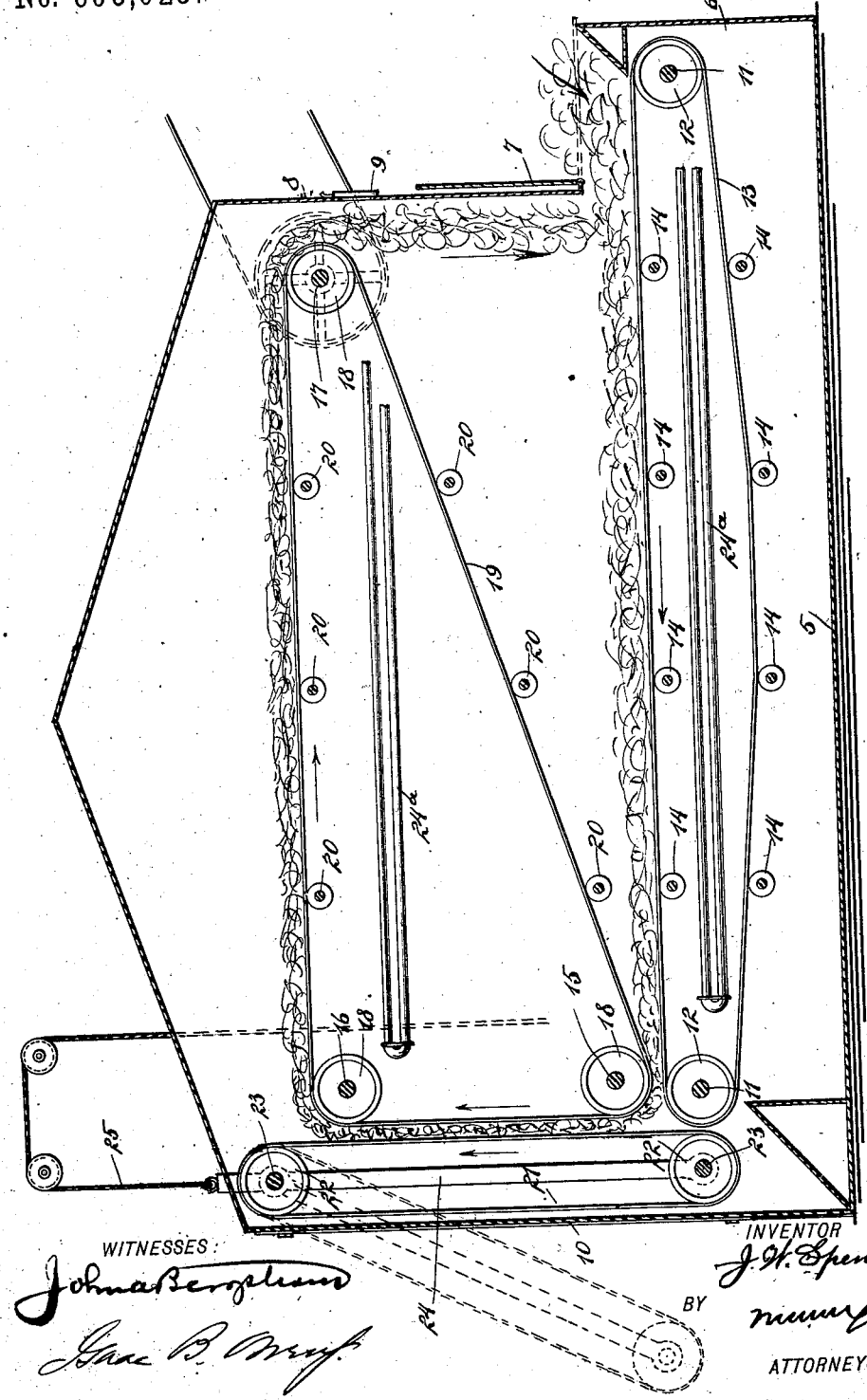

JAMES W. SPENCER, OF PROVIDENCE, RHODE ISLAND.

WOOL-DRIER.

SPECIFICATION forming part of Letters Patent No. 605,025, dated May 31, 1898.

Application filed September 3, 1897. Serial No. 650,485. (No model.)

*To all whom it may concern:*

Be it known that I, JAMES W. SPENCER, of Providence, in the county of Providence and State of Rhode Island, have invented a new and Improved Wool-Drier, of which the following is a full, clear, and exact description.

This invention is an apparatus by which wool may be dried and carbonized, the invention being in general characterized by a casing or housing in which a series of endless carriers are arranged, the casing or housing being heated by steam-pipes, so that the wool in circulating through the casing or housing is dried by the action of said pipes.

This specification is the disclosure of one form of my invention, while the claims define the actual scope of the conception.

Reference is to be had to the accompanying drawing, forming a part of this specification, and which represents a vertical section of a wool-drier constructed in accordance with my invention.

The casing has a bottom 5, with an outwardly-projected forward portion 6, the top of which is open to form a feed-orifice. A hinged lid 7 is mounted adjacent to the said feed-orifice to close the same, if desired. Above the projected portion 6 the front wall 8 of the casing is provided with an observation-opening 9, having a suitable closure. Through the observation-opening the condition of the wool within the casing may be seen. The rear wall of the casing is provided with a door 10, which may be opened to permit the discharge of the wool.

Mounted in the lower portion of the casing and respectively at the front and rear thereof are two horizontal shafts 11, on which wheels 12 are fixed, so as to carry the apron or conveyer 13. The runs of the apron 13 are horizontal and are supported on idler-rollers 14, suitably mounted in the casing. The upper run of the apron 13 passes beneath the feed-opening in the projection 6, so that the wool fed to the casing may be delivered upon the apron and carried horizontally and rearwardly through the casing. Three horizontal shafts 15, 16, and 17 are revolubly mounted in the casing. The shafts 15 and 16 are in vertical alinement with each other, the shaft 15 being adjacent to the rear shaft 11 and the shaft 16 being located at the upper portion of the casing. The shaft 17 is located at the forward portion of the casing above the observation-opening 9. The shafts 15, 16, and 17 carry wheels 18, over which an endless apron 19 runs. The upper run of the apron 19 is horizontal and the lower run extends diagonally between the shafts 15 and 17. The two runs are supported on idlers 20, similar to the idlers 14. An apron 21 is carried on wheels 22, in turn carried on shafts 23. The shafts 23 are vertically alined with each other, so that the runs of the apron 21 extend vertically. This places the forward run of the apron 21 and the rear run of the apron 19 parallel and in close proximity to each other, so that the wool may pass along the top run of the apron 13, up between the rear run of the apron 19 and the front run of the apron 21, and then forward over the top run of the apron 19, the wool being discharged at the front of said run to fall back upon the apron 13, whereupon it is carried rearward again. This operation is continued until the wool is sufficiently dry, whereupon the wool may be discharged from the machine by opening the door 10 and swinging outward the lower end of the apron 21 with the adjacent shaft 23 and pulley 22 or by raising the apron 21 with both shafts 23 and pulleys 22. These shafts 23 and pulleys 22 are mounted in a suitable frame 24, suspended by a rope 25, so that the shafts and pulleys may be raised or swung out of proximity to the rear end of the apron 13 to effect the discharge of the wool. The dotted lines in the drawing illustrate both the vertical movement of the apron and the rearward swinging of the apron, either of which may be resorted to, as desired. Steam-pipes 24$^a$ are located within the casing to heat the same.

In the use of the drier the wool is fed through the feed-opening until the machine is sufficiently charged, whereupon the feed-opening is closed by the door or cover 7. The several shafts and aprons are now set in operation, whereupon the wool is carried continuously over the aprons 13, 21, and 19. The heat from the pipes 24$^a$ serves to perform the necessary process on the wool, and when the wool has been sufficiently treated it is discharged, as before explained. Any suitable means may be provided for communicating movement to the several aprons.

Having thus described my invention, I claim as new and desire to secure by Letters Patent—

1. A wool-drying apparatus, having a casing with a forwardly-projected lower portion, the top of which is open to form a feed-orifice, an endless apron having two horizontal runs mounted in the lower portion of the casing and extending into the forwardly-projected portion beneath the feed-orifice, a second endless apron mounted in the casing above the first apron, and having three runs, representing each the side of a triangle, one run extending vertically perpendicular to the first-named apron, and the uppermost run of the second apron extending horizontally to the front of the casing, and a third endless apron extending vertically at the rear of the other aprons, the vertical run of the third apron passing into immediate proximity with the vertical run of the second apron, so that the wool will be conveyed in an endless course horizontally along the first apron, then vertically between the second and third aprons, and finally forwardly over the uppermost run of the second apron, from which the wool is dropped back to the first apron.

2. A wool-drying apparatus, having a casing, a horizontal endless apron arranged in the lower portion thereof and capable of carrying the wool in a horizontal plane, a second endless apron mounted above the first apron and within the casing, and having three runs describing a triangular form, one run extending upward from the first apron, the second run extending horizontally, and the third run extending diagonally between the first and second runs, and a third endless apron extending parallel and in proximity with the vertical run of the second apron.

JAMES W. SPENCER.

Witnesses:
LYMAN W. BUDLONG,
DAVID H. WOOD.